United States Patent [19]
Jardin

[11] Patent Number: 4,941,706
[45] Date of Patent: Jul. 17, 1990

[54] VEHICLE ROOF

[75] Inventor: Hans Jardin, Inning, Fed. Rep. of Germany

[73] Assignee: Webasto AG Fahrzeugtechnik, Gauting, Fed. Rep. of Germany

[21] Appl. No.: 232,174

[22] Filed: Aug. 15, 1988

[30] Foreign Application Priority Data

Aug. 20, 1987 [DE] Fed. Rep. of Germany ....... 3727721

[51] Int. Cl.⁵ ................................................. B60J 7/00
[52] U.S. Cl. .................................... 296/213; 296/214; 296/216
[58] Field of Search ................ 296/213, 214, 216, 221, 296/222, 223

[56] References Cited

U.S. PATENT DOCUMENTS

| | | | |
|---|---|---|---|
| 4,293,161 | 10/1981 | Lutz | 296/213 |
| 4,320,921 | 3/1982 | Schatzler | 296/214 X |
| 4,671,564 | 6/1987 | Sumida et al. | 296/214 |
| 4,749,227 | 6/1988 | Bienert et al. | 296/221 |

FOREIGN PATENT DOCUMENTS

| | | |
|---|---|---|
| 0035371 | 9/1981 | European Pat. Off. . |
| 2856015 | 10/1981 | Fed. Rep. of Germany . |
| 2039839 | 10/1978 | United Kingdom . |
| 2054478 | 2/1981 | United Kingdom . |
| 2201382 | 9/1988 | United Kingdom . |

Primary Examiner—Dennis H. Pedder
Attorney, Agent, or Firm—Sixbey, Friedman, Leedom & Ferguson

[57] ABSTRACT

A vehicle roof that has an aperture in a fixed roof area which can be opened and closed by a closure panel, and in which a fixed interior headliner covers the inside of the fixed vehicle roof, while a slidable interior headliner is provided that covers the underside of the closure panel. The guides for the slidable interior headliner may be provided as a separate part mounted on the fixed interior headliner or may be integrally formed as a portion of the fixed interior headliner. When the vehicle roof has a water drainage device, the guides for the slidable interior headliner can be provided on a water-collecting basin serving as a water drainage device. The guides for the slidable interior headliner function also as a water retaining partition for the water drainage device.

10 Claims, 2 Drawing Sheets

VEHICLE ROOF

BACKGROUND OF THE INVENTION

The invention relates to a vehicle roof with aperture provided on a fixed roof area that can be closed by a closure panel, which is slidable and/or may also be raised at its rearward edge, wherein an interior roof covering, designed as a fixed interior headliner, is provided along with a slidable interior headliner that covers the underside of the closure panel and which is independently slidable along guides relative to the closure panel.

In the conventional vehicle roofs of this type, such as that disclosed in U.S. Pat. No. 4,293,161, a plastic frame is utilized that provides sliding and reception surfaces for the slidable headliner in addition to guide ways and guide channels for the driving device of the closure panel. The underside of the frame partially forms the fixed interior headlining. The zone of the headlining between the outer edges of the frame and the outer boundary edges of the roof is covered with sections of plastic that are fastened with clips to the interior roof panel, on one side, and contact the frame, on the other side. Both the closure panel guiding and driving devices, as well as the bearing and sliding surfaces of the slidable interior headliner, are integrated into the plastic frame in this design of vehicle roof. Because of this feature, difficulties are encountered in matching the height of the slidable interior headliner with that of the fixed interior headlining as well as with the proper functioning of the slidable interior headliner. These difficulties are due to the fact that the frame is placed at a predetermined height, while the guide surface for the slidable interior headliner lacks a separate height adjustment feature. As a result, misalignments may occur which produce an exterior appearance of the headlining that is unattractive, due to conspicuous color differences being exposed between the slidable and fixed headliners, and/or which affect the ease of movement of the slidable headliner.

SUMMARY OF THE INVENTION

In order to overcome the previously described difficulties, it is an object of the invention to provide a vehicle roof of the general type mentioned above in which the slidable interior headliner can be adapted, as to color and structure, to achieve a visually attractive interior vehicle roof.

It is a further object of the invention to provide a vehicle roof of the general type in which the slidable interior headliner and the closure panel are structurally and operationally independent.

It is still another object of the invention to provide a vehicle roof that is designed to allow for height adjustment of the slidable interior headliner, both during and after assembly of the roof structure.

It is yet another object of the invention to provide a vehicle roof of the above-noted type with a water drainage feature to eliminate the flow of water into the passenger compartment.

Another object of the invention is to provide a vehicle roof of the previously described type in which the construction and assembly of the roof are simplified and the costs are reduced.

These objects and others are achieved, in accordance with preferred embodiments of the invention, by forming the slidable interior headliner guides, of a vehicle roof of the type previously described, directly on the fixed interior headliner.

In the vehicle roof according to the invention, the simplication of construction and assembly of the vehicle roof is obtained by the elimination of the bearing and sliding surfaces for the slidable interior headliner on the frame of the vehicle roof. As a result, the guide devices for the closure panel can be designed to be narrow and more compact, ensuring a close fitting relation between the slidable and fixed interior headliners. In addition, this design ensures that the exterior appearance of the interior headlining will be visually attractive with regard to color since no gaps will occur between the headliners of which it is composed.

According to an advantageous configuration of the present invention, the slidable interior headliner functions completely independent of the closure panel covering the roof aperture. As a result, difficulties in lining up the slidable interior headliner are avoided, since the guide devices for the closure panel can be lined up separately from the slidable interior headliner. Further, the overall costs of the vehicle roof of the present invention are reduced. This cost saving is obtained due to the elimination of additional component parts which are no longer necessary, as the slidable interior headliner only needs to be inserted in the guides that have been formed directly on the fixed interior headliner.

A further advantageous embodiment of the present invention is obtained by attaching separately designed slidable interior headliner guides to the fixed interior headliner. This allows for a blending of the slidable and fixed interior headliners because the height adjustment may be performed during assembly of the slidable interior headliner guides. Another advantage of this particular embodiment is the ability to vertically adjust the slidable interior headliner guides. The slidable interior headliner can be adjusted to the desired position and lined up after assembly of the vehicle roof.

In accordance with another aspect of the present invention, a vehicle roof is provided with a water drainage device. The water drainage device may, for example, be in the form of a water-collecting basin. According to the present invention, a water drainage device designed with a water-collecting basin may function as the guides for the slidable interior headliner. The slidable interior headliner guides are preferably formed directly on the water-collecting basin. This feature enables a considerable simplification of construction to be achieved when the fixed interior headliner is in the form of a stretched lining. The stretched lining can be fastened to the water-collecting basin, which is integral with the guides for the slidable interior headliner. As a result, no special parts are needed for the guides of the slidable interior headliner.

These and further objects, features, and advantages of the present invention will become more obvious from the following description when taken in connection with the accompanying drawings which show, for purposes of illustration only, two embodiments in accordance with the present invention.

BRIEF DESCRIPTION OF THE DRAWINGS

In the figures of the drawing the same or similar parts are provided with the same reference symbols, with modification between the embodiments being indicated by prime (′) designations in FIG. 3.

DETAILED DESCRIPTION OF THE PREFERRED EMBODIMENTS

Figure 1:
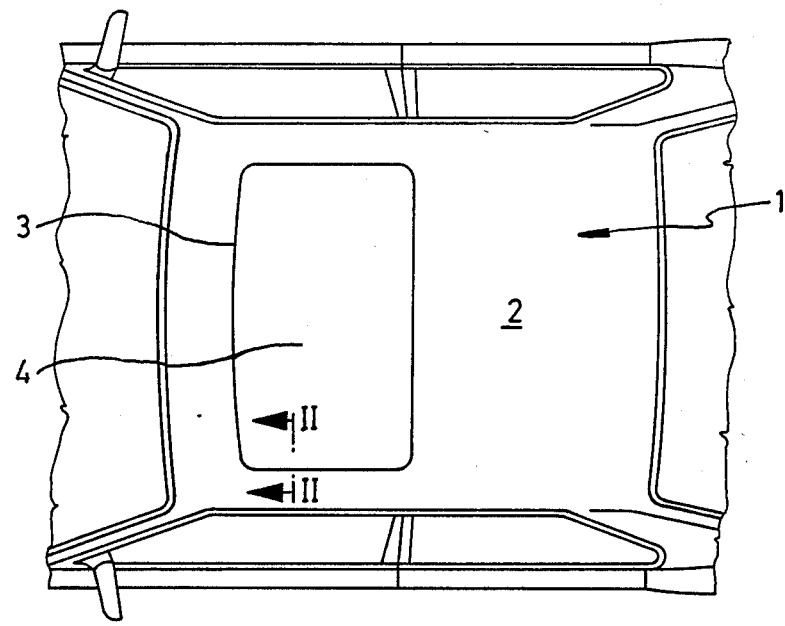
FIG. 1 is a diagrammatic top view of the vehicle roof of the present invention.

In FIG. 1, a vehicle roof, as a whole, is indicated as 1. In a fixed roof area 2 of vehicle roof 1, an opening 3 is provided that can be selectively opened and closed by a closure panel 4. Roof 1 may be of the type wherein the panel 4 is slidably retractable below the rear portion of fixed roof area 2 and/or may be tiltably raised at the rearward edge thereabove. The manner in which such displacement is achieved forms, per se, no part of this invention and any conventional mechanism known for this purpose may be used. The interior of vehicle roof 1 is covered by an interior headlining as described relative to FIGS. 2 and 3 below.

Figure 2:
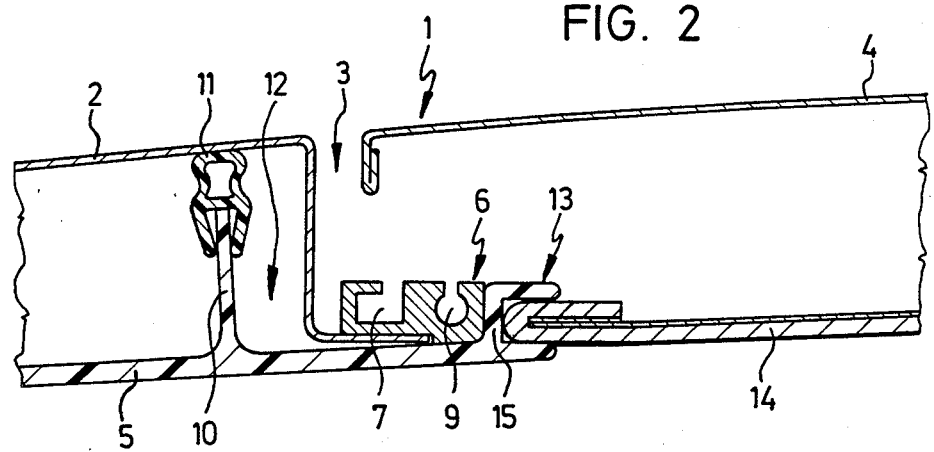
FIG. 2 is a diagrammatic sectional view of a first embodiment of a vehicle roof according to the invention, taken along the line II—II of FIG. 1.
Figure 3:
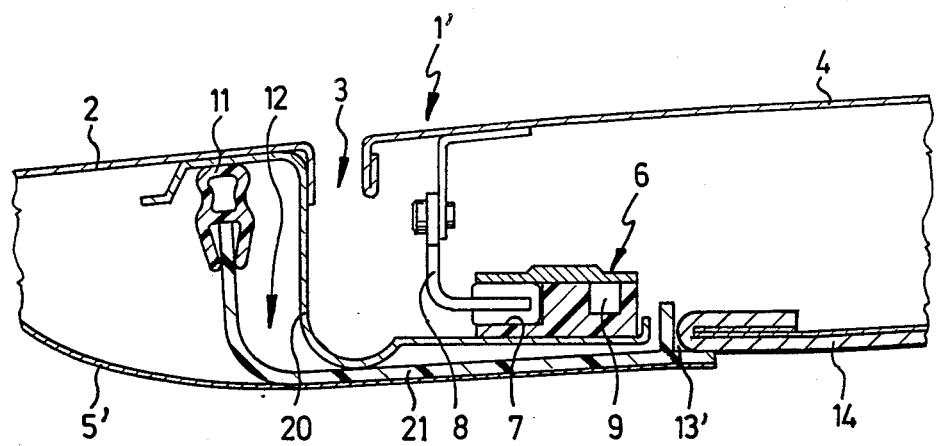
FIG. 3 is a diagrammatic sectional view of a second embodiment of a vehicle roof according to the invention, taken along line II—II of FIG. 1.

In FIG. 2, an embodiment of a vehicle roof 1 is shown in which fixed roof area 2 is bent inward in the area of roof opening 3 to form a supporting frame that carries a guide part 6 in which a track 7, e.g., for a guide element 8 to which cover 4 is attached, is provided as shown in FIG. 3. Furthermore, guide part 6 includes a guide channel 9 into which, for example, a drive cable of a drive device is inserted. The interior headlining of this preferred embodiment comprises a fixed interior roof headliner 5 and a sliding interior headliner 14. The fixed headliner 5 has a projecting web 10 that carries a continuous gasket 11 which contacts the inner surface of fixed roof area 2. In this case, interior headliner 5 functions, additionally, as a water drainage device 12. Next to guide part 6, guides 13 provide a track for sliding interior headliner 14. In the example shown, guides 13 are formed directly on interior headliner 5. Portion 15 of interior headliner 5 and guides 13 function, additionally, as a partition for water drainage device 12, that is formed by portion 10 of interior headliner 5.

In FIG. 3, vehicle roof 1′ comprises a fixed roof area 2 in which roof opening 3 is provided. Mounted to fixed roof area 2, along the perimeter of roof opening 3, is a separate frame 20 that supports guide part 6. Inserted in track 7 of guide part 6 is guide element 8, such as a conventional sliding guide shoe, which is connected with the closure panel 4 of vehicle roof 1′. As a water drainage device 12, a water-collecting basin 21 is provided that is formed between interior headliner 5′ and frame 20. In this alternative embodiment, slidable interior headliner 14 runs along guides 13′, which are constructed at an edge of water-collecting basin 21 that is directed inwardly toward the center of roof opening 3. Furthermore, with guides 13′ for sliding interior headliner 14 being formed on basin 21, the fixed interior headliner need not be formed by a rigid fixed interior headliner 5, as is shown in FIG. 2, but may be a stretched interior headliner 5′ that is formed of a fabric, for example. The stretched interior headliner 5′ is fastened to the underside of water-collecting basin 21 and is attached, e.g., to the perimeter of the roof, under tension.

Although it is not shown in greater detail in the figures provided in the drawing, guides 13 and 13′, for sliding inside roof lining 14, need not be constructed directly as a portion of the fixed interior headliner 5 or on water-collecting basin 21. Instead the guides can be formed from separate parts that can be attached to the fixed interior headliner 5 or water-collecting basin 21 and which can serve to line up sliding interior headliner 14, particularly by making the, guides 13 and 13′ vertically adjustable.

As the above embodiments have shown, vehicle roof 1 and 1′ make it possible for guides 13 and 13′, used for sliding interior headliner 14, not to be located on the frame of the vehicle roof, but on the interior headliner 5 or on a water-collecting basin 21. As a result, guides 13 and 13′ can simultaneously form a water retaining partition for the water-bearing area, so that no water from the water drainage device can penetrate inside the passenger compartment.

While I have shown and described several embodiments in accordance with the present invention, it is understood that the same is not limited thereto, but is susceptible of numerous changes and modifications as known to those skilled in the art. For example, in the FIG. 2 embodiment the downturned support frame may be a separate part as shown for frame 20 in FIG. 3 or frame 20 of FIG. 3 may be a downturned portion of fixed roof area 2, as in the FIG. 2 embodiment. I, therefore, do not wish to be limited to the details shown and described herein, but intend to cover all such changes and modifications as are encompassed by the scope of the appended claims.

I claim:

1. Vehicle roof having a fixed roof area having an aperture formed therein, a closure panel for selectively opening and closing said aperture, a support frame carrying drive and guide parts for sliding the closure panel, and an interior headlining comprised of a fixed interior headliner for covering an interior side of the fixed roof area, a slidable interior headliner for covering an interior side of said closure panel, guide means for slidably guiding said slidable interior headliner; wherein said fixed interior headliner and said support frame constitute separate structures for separately carrying each of said guide means and said closure panel; wherein said separate structures act in a manner forming a means for enabling the guide means and closure panel to be supported, and adjusted independent of each other, the guide means being carried by said fixed interior headliner and said closure panel being supported upon said support frame.

2. Vehicle roof according to claim 1, wherein said guide means for the slidable interior headliner is an integrally formed portion of said fixed interior headliner.

3. Vehicle roof according to claim 1, wherein said guide means is formed as a separate part from said fixed interior headliner.

4. Vehicle roof according to claim 3, wherein said guide means is formed on a water drainage device carried by said fixed roof.

5. Vehicle roof according to claim 4, wherein said fixed interior headliner is a fabriclike material.

6. Vehicle roof having a fixed roof area having an aperture formed therein, a closure panel for selectively opening and closing said aperture, a support frame carrying drive and guide parts for sliding the closure panel, a water drainage device and an interior headlining comprised of a fixed interior headliner for covering an interior side of the fixed roof area, a slidable interior headliner for covering an interior side of said closure panel, guide means for slidably guiding said slidable interior headliner; wherein the water drainage device and support frame constitute separate structures for separately carrying said guide means and said closure panel; wherein said separate structures act in a manner forming a means for enabling the guide means and closure panel to be supported, and adjusted independent of each other, said guide means being carried on a water-collecting basing forming the water drainage device of the vehicle roof and said closure panel being supported upon said support frame.

7. Vehicle roof according to claim 6, wherein said guide means for the slidable interior headliner is an integrally formed portion of said water-collecting basin.

8. Vehicle roof according to claim 6, wherein said guide means forms a water retaining portion of the water-collecting basin.

9. Vehicle roof according to claim 6, wherein said fixed interior headliner is a fabriclike material.

10. Vehicle roof according to claim 9, wherein said water-collecting basin is on a top surface of said fixed interior headliner.

* * * * *